3,029,245
PREPARATION OF AROMATIC NITRILES
Robert S. Aries, 225 Greenwich Ave., Stamford, Conn.
No Drawing. Filed Oct. 23, 1959, Ser. No. 848,200
13 Claims. (Cl. 260—294.9)

This invention relates to a novel process for the conversion of aromatic carboxylic acids to the corresponding nitriles. More particularly, the invention relates to the vapor phase conversion to nitriles of aromatic compounds containing both alkyl and carboxylic acid groups, or of a mixture of an alkyl-aromatic compound and an aromatic carboxylic acid, or of a mixture of an alkylpyridine and a pyridine carboxylic acid by treatment with ammonia and oxygen in presence of a catalyst.

This application is a continuation-in-part of my copending application, Serial No. 594,712, now abandoned, filed June 29, 1956.

Heretofore, alkyl-substituted aromatic compounds have been reacted with air and ammonia, to convert the alkyl group to the cyano group in a single pass. While the exact mechanism is not certain, it appears that partial oxidation of the alkyl group is initiated and this partially oxidized group reacts with the ammonia to form the nitrile. Although this process effects the conversion in one step, it suffers from the disadvantage that an appreciable amount of the starting material is either oxidized completely, or is oxidized to a greater extent than desired, so that comparatively low yields are obtained. This is believed due to the fact that the reaction is difficult to control because of its highly exothermic character which gives rise to localized overheating of the oxidation catalyst employed.

I have now found that if the overall reaction of oxidation of the alkyl-aromatic compound and the reaction with ammonia is carried out in two stages it is more easily controllable as to maximum temperature reached and the difficulties arising from localized overheating are avoided. On the single stage operation, all of the heat liberated by the total reaction must be absorbed and carried off by the gaseous reaction products which have comparatively low specific heats and are thus raised to high temperatures. But if the starting material is first partially oxidized, the completion of such partial oxidation will liberate only part of the heat evolved by the total oxidation in one step, and furthermore such first stage partial oxidation is carried out at relatively low temperature in the liquid phase whereby such oxidation temperature is easily controlled by refluxing of the alkyl-aromatic raw material. All the heat liberated in this preliminary partial oxidation is completely removed from the system before the second stage operation of conversion to the nitrile, and thus does not contribute at all to the heat liberation in the second stage of the conversion to nitrile which is carried out under vapor phase conditions in which removal of liberated heat by refluxing is no longer possible.

In addition, the organic molecules or portions of molecules which are already oxidized will function in the second step as diluents for those molecules or portions of molecules undergoing oxidation and will lead to a smaller rise in temperature. Furthermore, the specific heats of these organic materials are considerably higher than those of the reactant or product gases so that a further advantage is achieved with respect to reaction control and dissipation of generated heat.

Moreover, the conversion of a carboxylic acid group, —COOH, to a nitrile group, —CN, is an endothermic reaction and therefore this conversion actually takes up some of the heat which is liberated during the diminished exothermic oxidation reaction which results from the conversion of the remaining alkyl groups, such as —$CH_3$ or, more generally, —$C_nH_{2n+1}$ to the carboxylic groups —COOH which, in turn, are converted to —CN.

The reactions of my novel process may proceed with the use of a mixture of a mononuclear alkyl-aromatic compound and a mononuclear aromatic carboxylic acid compound or a mixture of an alkyl pyridine and a pyridine carboxylic acid, or a single mononuclear aromatic compound containing both alkyl and carboxylic acid groups. The alkyl group will generally be a lower alkyl group. The alkyl-aromatic compound will preferably be a hydrocarbon compound. The special advantage of my novel process is that the raw material, whether it is a mixture including an aromatic carboxylic acid compound or a single compound containing both alkyl and carboxylic groups, does not liberate the heat which would be liberated in the conversion of alkyl groups to carboxyl groups to the extent that carboxyl groups have already been formed and are present.

It is, of course, understandable that with respect to mixtures of alkyl-aromatic compounds and aromatic carboxylic acids the proportions of such carboxylic acid compounds present in the mixtures determine the beneficial effect with respect to temperature control. A very small amount of such carboxylic acid compounds present in the mixture to be converted to a nitrile will have a small beneficial effect, while a larger amount will have a larger beneficial effect in the matter of heat liberation and temperature control. Amounts of aromatic carboxylic acid or of pyridine carboxylic acid present may vary from about 20% to about 70% by weight or more of the mixture if a mixture of a mono-alkyl-aromatic compound and an aromatic carboxylic acid compound or of an alkylpyridine and the corresponding pyridine carboxylic acid is to be converted to a nitrile, but I generally prefer, in the case where a mono-nitrile is to be formed, to use a mixture of approximately equal parts by weight. Thus, if benzonitrile is the desired product, I prefer to use equal parts by weight of benzoic acid and toluene as raw material, but lesser or greater proportions of benzoic acid may be used provided the proportion of benzoic acid is not less than about 20% by weight. If more than, for example, 70% by weight of benzoic acid is used no harm results, of course, except that a smaller amount of toluene is converted to the nitrile than the maximum possible, and it is desirable to convert as much toluene to nitrile as possible since toluene is a cheaper raw material than benzoic acid.

If the alkyl-aromatic compound to be converted to benzonitrile in this instance is, for example, ethylbenzene instead of toluene, the heat liberated on oxidation of the alkyl-group to carboxyl is greater, both on a molar and a weight basis, and it would be desirable to have more benzoic acid present, so that the minimum proportion of benzoic acid in the mixture of ethylbenzene and benzoic acid would be of the order of 30%, and the maximum desirable for economic reasons would be 70%, although even higher proportions of benzoic acid would yield completely satisfactory results.

It should be noted that in the mixture of alkyl-aromatic compound and carboxylic acid a carboxylic acid may be used which yields a different nitrile than the alkyl-aromatic compound used, as, for instance, a mixture of benzoic acid and para-xylene which will yield a mixture of benzonitrile (derived from the benzoic acid) and terephthalonitrile (derived from the para-xylene). The mixtures of nitriles derived from such operations can be separated from each other by fractional distillation, preferably under reduced pressures, but in general I prefer to use a mixture of alkyl-aromatic compound and aromatic carboxylic acid which yields a single nitrile, as in this manner the purification procedure to obtain the pure nitrile is simpler.

In the case in which a polyalkyl aromatic compound is to be converted to a nitrile compound containing more than one nitrile group the two stage process may be carried out by converting in the first stage the polyalkyl aromatic compound to a mono-carboxylic acid, or to a mixture containing both a mono-carboxylic acid and unchanged polyalkyl-aromatic compound, or to a mixture of mono-carboxylic and di-carboxylic acid with or without unchanged polyalkyl-aromatic compound. For example, in converting para-xylene to terephthalonitrile, the para-xylene may be converted in the first stage to para-toluic acid with or without some terephthalic acid, and such para-toluic acid or mixture of para-toluic acid with varying amounts of terephthalic acid together with para-xylene are converted in the second stage to terephthalonitrile.

The proportion by weight of carboxylic acids in such mixtures, particularly in the case of di-alkyl-aromatic compounds to be converted to dinitriles, should be at least 40% of monocarboxylic acid and preferably 80% of monocarboxylic acid or more—or at least 20% of dicarboxylic acid and preferably up to 50% of dicarboxylic or more. Where mixtures of monocarboxylic and dicarboxylic acids are produced in the first stage of the two stage process, at least 20% of the total alkyl groups convertible to carboxylic acid groups should be converted to carboxylic acid groups, and preferably 40 to 50%.

It may be noted that the carboxylic acid compounds may be prepared or obtained separately and added to the alkyl-aromatic compound to be converted to nitrile or dinitrile, but in general it is more economical to convert the alkyl-aromatic compound to the required carboxylic acid or carboxylic acids wholly or in part and to proceed to the second stage production of nitriles without separating the carboxylic acids, except that part of the excess alkyl-aromatic compound may be removed so that the proportion of carboxylic acid in the residual oxidized mixture comes within the preferred range indicated.

The reaction of conversion of such mixtures of alkyl-aromatic compound and carboxylic acid, or of alkyl-aromatic carboxylic acids to nitriles is effected in the vapor phase in the temperature range of about 300° C. to 600° C., and preferably in the range of 350° C. to 500° C. For each alkyl or carboxylic acid group which is to be converted to the nitrile group, one mole of ammonia is theoretically necessary. I have found the practical minimum to be at least 2 moles of ammonia and the preferred range to be two to four moles of ammonia. Amounts above four moles of ammonia per alkyl or carboxylic group do not increase the yield. For each methyl group being converted to a nitrile group, for which the overall reaction may be written

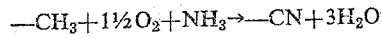
$$-CH_3 + 1\tfrac{1}{2}O_2 + NH_3 \rightarrow -CN + 3H_2O$$

there should be employed at least two moles of oxygen, i.e. at least 10 moles of air. Preferably the molar ratio of oxygen should range between about four and twenty per mole of methyl group to be converted, and appropriately higher for other alkyl groups, in which case each additional methylene function $-CH_2-$ requires theoretically, according to the reaction

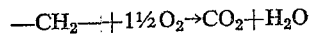
$$-CH_2- + 1\tfrac{1}{2}O_2 \rightarrow CO_2 + H_2O$$

one and one half moles of oxygen to remove the additional atoms to yield a carboxylic acid group as carbon dioxide and water. Preferably, however, at least four moles of oxygen are employed for each additional methylene group. Thus, to convert an ethyl radical, i.e., methylene-methyl, or $-CH_2-CH_3$, to CN, preferably four plus four or eight moles of oxygen should be employed as a minimum, or the appropriate amount of air containing such preferable amount of oxygen.

The oxidation catalysts which can be employed in the practice of the second stage of the invention, namely the conversion to nitriles, are numerous and include one or more of the finely divided polyvalent metals such as vanadium, molybdenum, chromium, cobalt, iron, tungsten, manganese, copper, uranium, aluminum and the like, as well as their oxides, all of which are well known and do not require detailed description. Preferred catalysts are vanadium and its oxides, such as, for example, vanadium oxide on silica gel, vanadium oxide on alumina, or vanadia oxide on pumice. In fact, the various commercial catalysts used in the oxidation of naphthalene to phthalic anhydride in the vapor phase have proved satisfactory. The vanadium or other catalyst fills the reactor zone and the vapor passes through it at high space velocity, ranging from about 4,000 to 10,000 volumes of reactants per unit volume of catalyst per hour. This is because the production of nitriles from alkyl-aromatic compounds has, as its first stage, the oxidation of the alkyl group to carboxyl which, in turn, reacts with ammonia to form—through one or more intermediate stages—the nitrile.

The preliminary oxidation of the alkyl-aromatic to a mixture of carboxylic acid and unchanged alkyl-aromatic compound can be advantageously carried out in the liquid phase under moderate pressures by air, as is known in the art, and for this preliminary oxidation a conventional liquid phase oxidation catalyst such as a cobalt salt or manganese salt is satisfactory. The quantity of catalyst employed should be sufficient to effect a reasonably rapid reaction rate, a suitable amount being from about 0.02% to 0.5% by weight, preferably about 0.2%. The catalyst may be dissolved in the hydrocarbon for the first stage oxidation. Cobalt naphthenate, cobalt benzoate, cobalt toluate, cobalt acetate, cobalt propionate, and other cobalt salts, or manganese bromide, or mixtures of these, are satisfactory catalysts for this liquid phase oxidation.

The novel process is suited for the preparation of benzonitrile from a mixture of benzoic acid and an alkyl-substituted benzene such as toluene or ethylbenzene. In this instance, the alkyl group (in toluene or ethylbenzene) and the carboxyl group (benzoic acid) are on separate molecules. In another preferred embodiment of this invention, both the alkyl group and the carboxyl group are on the same molecule as, for instance, in the case of the toluic acids. The yields obtained in this latter case are superior to those obtained by what would appear to be analogous reactions wherein a compound containing exclusively either carboxylic acid groups or exclusively alkyl groups is used in equimolecular proportions for conversion to the dinitrile.

The starting material for the conversion by the present invention can conveniently be prepared by blowing an alkyl-aromatic compound with air in the presence of conventional liquid phase oxidation catalysts such as the cobalt salts or manganese salts above mentioned or their mixtures whereby a portion of the alkyl groups are oxidized to carboxyl groups. Where a polyalkyl compound such as a xylene is employed, this stage of liquid phase air oxidation is substantially self-regulating since substantially only one methyl group is normally oxidized per molecule, leading to the production of a toluic acid. To oxidize the second methyl group under liquid phase conditions more drastic oxidizing conditions are required as, for instance, oxidation by nitric acid under pressure and more elevated temperatures such as 180–200° C., whereas the air oxidation of the first methyl group to form toluic acids is in the range of approximately 130–150° C. To carry out my invention the product of the air oxidation is satisfactory, but a mixture of a xylene with its derived toluic acid and/or its derived phthalic acid, however produced, is also satisfactory—but the preferred method, both for ease of operation and with respect to cost, is to submit the product of the liquid phase oxidation, largely the toluic acid, to the further action of air and ammonia with the indicated catalyst as previously described.

The following examples illustrate procedures in accordance with the present invention:

Example I 500 grams of 98% para-xylene and 1.0 gram of cobalt naphthenate are charged to a 1 liter rocker bomb and heated to 130° C. The system is pressurized to 40 p.s.i.g. with air and air is bubbled through the charge at the rate of 1.2 liters per minute under reflux under pressure, excess gases being vented through a pressure release valve set to release cooled gases at 40 p.s.i.g. The reaction is stopped by cooling at the end of 15 hours. The reaction product is distilled to remove the major portion of the unreacted para-xylene. The cooled residue weighs 370 grams and still contains a small amount of unreacted para-xylene. Calculated entirely as para-toluic acid, this residue corresponds to the product of oxidation of 288.5 grams of para-xylene entirely to para-toluic acid.

This residue is fed into a vaporizer at the rate of 5 grams per hour. The vaporizer is maintained at 300° C. and ammonia is fed in at 40 liters per hour and air at 15 liters per hour. This ratio is outside of the explosive range. The gaseous mixture of air, ammonia and vaporized organic material is conducted into a catalyst zone consisting of a 1 inch stainless steel pipe containing 25 cc. of a vanadium catalyst prepared by depositing vanadium oxide on ⅛ inch alumina pellets. The vanadium oxide catalyst is prepared by mixing 100 cc. of saturated ammonium meta-vanadate solution, containing about 5 grams of ammonium meta-vanadate, with 25 cc. of ⅛ inch alumina pellets in a stainless steel dish and heating slowly on a sand bath with occasional stirring by a stainless steel spatula until the mixture is apparently dry and then heating to 400° C. in a furnace for 4 hours, followed by cooling.

The catalyst zone is maintained at 375° C. The reaction is carried out for 5 hours, using a total of 25 grams of the crude paratoluic acid. The reaction products are condensed out by passing the produced vapors through a condenser into a flask immersed in a solid carbon dioxide-acetone bath. The condensate thus obtained after the reaction is completed is allowed to warm up to room temperature and the product is found to be substantially pure terephthalonitrile (19.06 grams) in a yield of 81% of theory based on 25 grams of toluic acid used.

Example II

The rocker bomb oxidation of Example I is repeated except that 500 grams of meta-xylene of 98% purity are used instead of 500 grams of para-xylene. The reaction product weighs 590 grams and the unreacted meta-xylene is not distilled off. The product represents the equivalent of 318.7 grams of xylene converted to toluic acid and 181.3 grams of unconverted xylene, or 408.7 grams of toluic acid and 181.3 grams of meta-xylene. On a weight basis this material contains 1180 (590×2) alkyl plus carboxyl groups (on an arbitrary relative scale) of which 408.7 are carboxyl groups, so that the proportion of carboxyl groups is 34.6% of the total alkyl plus carboxyl groups.

This reaction mixture, consisting of a mixture of meta-toluic acid and meta-xylene is fed into the vaporizer of Example I maintained at 300° C. and air is fed in at 40 liters per hour and the ammonia rate is 15 liters per hour. The catalyst consists of vanadium oxide (from ammonium meta vanadate) on silica gel and the temperature of the reaction zone is maintained at 500° C. The yield of isophthalonitrile is 83% of theory based on the meta-xylene consumed in the form of the partially oxidized product. No unreacted meta-xylene is present in the reaction product.

Example III 500 grams of mixed xylene isomers are oxidized as was 500 grams of para-xylene in Example I. Conditions for both the rocker bomb first stage oxidation and the vapor phase step of conversion to nitriles are the same as in Example I except that a commercial supported vanadium catalyst, such as is recommended for the oxidation of naphthalene to phthalic anhydride, is used. The product is a mixture of isomeric phthalonitriles.

Example IV

Example I is repeated, using toluene instead of para-xylene, except the temperature of the first stage oxidation is 180° C., the pressure is 150 p.s.i.g., the air rate is 15 liters per minute and the total reaction time is 3 hours. The product is a mixture of benzoic acid and toluene, with smaller quantities of benzyl alcohol, benzaldehyde and benzyl benzoate. Most of the unreacted toluene is distilled off and the residue of oxidized products with some residual toluene weighs 530 grams. The 530 grams, computed as all benzoic acid, corresponds to 4 moles of toluene having been converted to benzoic acid for each mole of toluene remaining unconverted. This material is fed into the vaporizer of Example I at the rate of 20 grams per hour with air and ammonia rates as in Example I, but the temperature is held at 425° C. in the catalyst zone. The yield of benzonitrile calculated on toluene consumed is 93% of theory, and is free from toluene.

Example V

Example IV is repeated, except that unreacted toluene is not distilled out of the reaction product obtained from the rocker bomb. The feed rate to the vaporizer is 7.0 grams per hour. The yield is 89% of theory of benzonitrile based on the total toluene and no unreacted toluene is detected in the final reaction product.

Example VI

A mixture consisting of equal parts by weight of commerical technical benzoic acid and toluene is fed into the vaporizer as in Example I, except that the air rate is 60 liters per hour, the ammonia rate is 20 liters per hour and the temperature in the catalyst zone is 475° C. The yield of benzonitrile based on both benzoic acid and toluene is 90% of theory and no unreacted toluene is found in the product.

Example VII

A mixture of equal parts by weight of 3-picoline and niacin (3-pyridine-carboxylic acid) is fed into the vaporizer, as in Example VI, and the temperature of the catalyst zone is maintained at 390° C. A yield of 3-cyanopyridine of 92% of theory based on the total of both 3-picoline and niacin used is obtained.

I claim:

1. Process for the preparation of nitriles, which comprises passing a mixture of a mononuclear lower alkyl-aromatic hydrocarbon compound and a mononuclear aromatic carboxylic acid, the proportion of carboxylic acid in said mixture ranging from about 20% to about 70% by weight, in the vapor phase, in admixture with ammonia and an oxygen-containing gas, at least 1 mole of ammonia being present for each alkyl group and each carboxylic acid group and at least 2 moles of oxygen being present for each alkyl group, over an oxidation catalyst selected from the group consisting of the polyvalent metals of groups I(B), III(A), V(B), VI and VII(B) of the periodic system and their oxides, at a temperature between about 300° C. and about 600° C., whereby said alkyl groups and carboxylic acid groups are converted to nitrile groups.

2. Process for the preparation of nitriles which comprises partially oxidizing a lower alkyl-aromatic hydrocarbon with air in the presence of an oxidation catalyst comprising a cobalt salt to obtain a mononuclear aromatic compound in which at least 20% of the alkyl groups have been converted to carboxylic acid groups, and then passing said lower alkyl aromatic compound containing both lower alkyl and carboxylic acid groups, in the vapor phase, in admixture with ammonia and an oxygen-containing gas, at least 2 moles of ammonia being present for each alkyl and each carboxylic acid group, and at least 4 moles of oxygen being present for each alkyl group, at a temperature between about 300° C., and about 600° C., over an oxidation catalyst selected from the group consisting of the polyvalent metals of groups I(B), III(A), V(B), VI(B) and VII(B) of the periodic system and their oxides, whereby said alkyl and carboxylic acid groups are converted to nitrile groups.

3. Process for the preparation of benzonitrile, which comprises partially oxidizing toluene with air in the presence of an oxidation catalyst comprising a cobalt salt to obtain a mixture of toluene and benzoic acid, and then passing said mixture, in the vapor phase, in admixture with ammonia and air, at least 2 moles of ammonia and at least 20 moles of air being present for each mole of toluene, at a temperature between about 350° C. and about 500° C., over an oxidation catalyst selected from the group consisting of the polyvalent metals of groups I(B), III(A), V(B), VI(B) and VII(B) of the periodic system and their oxides, whereby substantially all of said toluene and benzoic acid are converted to benzonitrile.

4. Process for the preparation of a cyanopyridine, which comprises passing a mixture of a lower alkylpyridine and the corresponding pyridine carboxylic acid, the proportion of carboxylic acid in said mixture ranging from about 20% to about 70% by weight, in the vapor phase, in admixture with ammonia and an oxygen-containing gas, at least 2 moles of ammonia being present for each mole of lower alkyl pyridine and pyridine carboxylic acid and at least 4 moles of oxygen being present for each mole of lower alkylpyridine, at a temperature between about 350° C., and about 500° C., over an oxidation catalyst selected from the group consisting of the polyvalent metals of groups I(B), III(A), V(B), VI(B) and VII(B) of the periodic system and their oxides, whereby said lower alkylpyridine and pyridine carboxylic acid are converted to the corresponding cyanopyridine.

5. The process of claim 4, in which the lower alkylpyridine is 3-picoline and the pyridine carboxylic acid is 3-pyridine carboxylic acid.

6. The process of claim 3, in which the mixture of toluene and benzoic acid is subjected to distillation to remove at least a portion of the toluene.

7. Process for the preparation of terephthalonitrile which comprises partially oxidizing para-xylene with air in the presence of an oxidation catalyst comprising a cobalt salt to obtain a mixture of unreacted para-xylene and para-toluic acid, removing said unreacted para-xylene by distillation, passing said para-toluic acid in the vapor phase, in admixture with ammonia and an oxygen-containing gas, at least 2 moles of ammonia and at least 4 moles of oxygen being present for each mole of toluic acid, at a temperature between about 350° C. and about 500° C., over an oxidation catalyst selected from the group consisting of the polyvalent metals of groups I(B), III(A), V(B), VI(B), and VII(B) of the periodic system and their oxides, where said toluic acid is substantially completely converted to terephthalonitrile.

8. Process for the preparation of terephthalonitrile which comprises passing para-toluic acid in the vapor phase, in admixture with at least 2 moles of ammonia and at least 20 moles of air, at a temperature between about 350° C., and about 500° C., over an oxidation catalyst selected from the group consisting of the polyvalent metals of groups I(B), III(A), V(B), VI(B) and VII(B), of the periodic system and their oxides, whereby said toluic acid is converted to terephthalonitrile.

9. Process for the preparation of a phthalonitrile which comprises partially oxidizing a xylene with air in the presence of an oxidation catalyst comprising a cobalt salt, to obtain a mixture of a toluic acid and unreacted xylene, the proportion of toluic acid in said mixture ranging from about 20% to about 70% by weight, then passing said toluic acid, in the vapor phase, in admixture with ammonia and an oxygen-containing gas, at least 2 moles of ammonia and at least 4 moles of oxygen being present for each mole of toluic acid, at a temperature between about 350° C. and about 500° C., over an oxidation catalyst selected from the group consisting of the polyvalent metals of groups I(B), III(A), V(B), VI(B) and VII(B), of the periodic system and their oxides, whereby said toluic acid is substantially completely converted to a phthalonitrile.

10. The process of claim 9 in which the unreacted xylene is removed from the toluic acid by distillation.

11. The process of claim 9 in which the xylene is meta-xylene, and the nitrile is iso-phthalonitrile.

12. The process of claim 1 in which the cobalt salt is cobalt naphthenate.

13. The process of claim 1 in which the polyvalent metal catalyst is vanadium oxide.

References Cited in the file of this patent

UNITED STATES PATENTS

| | | |
|---|---|---|
| 2,302,462 | Palmer et al. | Nov. 17, 1942 |
| 2,499,055 | Cosby et al. | Feb. 28, 1950 |
| 2,510,605 | Porter et al. | June 6, 1950 |
| 2,680,742 | Scudi et al. | June 8, 1954 |
| 2,789,980 | Scudi et al. | Apr. 23, 1957 |
| 2,861,999 | D'Alessandro | Nov. 25, 1958 |
| 2,901,504 | Aries | Aug. 25, 1959 |

FOREIGN PATENTS

| | | |
|---|---|---|
| 721,905 | Great Britain | Jan. 12, 1955 |
| 528,258 | Canada | July 24, 1956 |